United States Patent [19]

Lamoureux

[11] Patent Number: 4,655,307

[45] Date of Patent: Apr. 7, 1987

[54] BELLY PAN FOR FOUR WHEEL ALL TERRAIN VEHICLES

[76] Inventor: Robert Lamoureux, R.F.D. 5, Box 39, Pelham, N.H. 03076

[21] Appl. No.: 731,104

[22] Filed: May 6, 1985

[51] Int. Cl.$^4$ .............................................. B60R 27/00
[52] U.S. Cl. ............................... 180/69.1; 280/289 G; 280/770; 296/188
[58] Field of Search ............... 280/770, 157, 289 G; 180/69.1, 210, 217, 219; 296/38, 188, 1 S; 172/508, 517

[56] References Cited

U.S. PATENT DOCUMENTS

| 2,126,943 | 8/1938 | Best | 296/1 S |
| 2,931,453 | 4/1960 | Inglese | 180/69.1 |
| 3,869,061 | 3/1975 | Wanner | 180/69.1 |
| 4,326,445 | 4/1982 | Bemiss | 296/188 |

FOREIGN PATENT DOCUMENTS 497449  5/1930  Fed. Rep. of Germany ..... 180/69.1

Primary Examiner—John J. Love
Assistant Examiner—Richard Camby
Attorney, Agent, or Firm—Pearson & Pearson

[57] ABSTRACT

A belly pan, or blanket, of thick, reinforced, rubber-like, flexible material is of elongated shaped outline to be mounted along the bottom of a four wheel, all terrain vehicle to protect the exposed undercarriage from damage by stumps, rocks, and the like. The belly pan is provided with a tapered front portion to be bent up and attached over the front bumper and then extends rearwardly, under the vehicle, to a portion of reduced width, formed by opposite arcuate cut-outs to accommodate the turning of the front wheels. It then extends rearwardly to between the rear wheels in a rectangular portion containing an oil drain access hole and the rearward edge is affixed to the metal pan of the vehicle. A pair of integral oppositely disposed laterally extending flaps are provided proximate the cut-outs to protect the front wheel axles.

4 Claims, 4 Drawing Figures

BELLY PAN FOR FOUR WHEEL ALL TERRAIN VEHICLES

BACKGROUND OF THE INVENTION

Four wheel, all terrain, vehicles are much in use for travelling through rough country, along paths in woods, over low obstacles, and otherwise carrying a single operator over terrain of all types at relatively high speed where ordinary vehicles could not proceed. Such vehicles have a pair of front wheels with balloon tires which are smaller in diameter than the similar balloon tires of the rear wheels, they are steered by handlebars, the motor is in the center of the vehicle and while there is a metal front bumper, the undercarriage is exposed except for a short metal pan at the rear.

Thus, the gear boxes, brake housings, crank case, and other parts, constituting the exposed bottom, or undercarriage, is vulnerable to damage from rocks, stumps, and other solid obstacles lying in the path and likely to cause a breakdown of the vehicle or injury to the operator.

It has heretofore been proposed to provide rigid metal protection for all terrain vehicles of the armored, endless track, military tank type, but such heavy armor plate is built-in and its weight would defeat the sporting purpose of the all terrain vehicles for which this invention is intended.

Similar, rigid unyieldable, metal guards have been proposed for two wheel motor vehicles, as exemplified in the engine guard roll bars of Lucier et al. U.S. Pat. No. 3,902,740 of Sept. 2, 1975 and the leg shield and crash bar of Vertucci U.S. Pat. No. 4,136,890 to of Jan. 30, 1979.

A plastic storage box which forms part of the bottom of a three wheel vehicle is disclosed in Pivar U.S. Pat. No. 4,325,448 of Apr. 20, 1982.

SUMMARY OF THE INVENTION

However, none of the above patents disclose a belly pan, or blanket of resilient, yieldable, reinforced, rubber-like material which covers the entire exposed undercarriage of a four wheel vehicle from front to rear, and from side to side, and which is removably attached to the vehicle. In addition, the rubber-like belly pan of the invention is shaped with a taper at the front, and with arcuate cut-outs near the front, to permit the front wheels to turn without interference. It also includes integral, laterally projecting flaps between the tapered portion and the cut-out portion to cover the front wheel pivot mechanism and axles. It further includes the tapered front portion, which can be bent upwardly in a curve, to form a yieldable, resilient front bumper, attached by bolts along its forward edge, over the original equipment metal bumper. If the bumper has been bent and damaged, the intermediate portion of the belly pan includes two parallel rows of bolt holes, each extending longitudinally, so that one set of holes can be bolted to the foot peg bar regardless of front bumper damage.

The belly pan further includes an oval, elongated, oil drain access hole in the intermediate portion so that it will register with the oil drain plug of the vehicle, also regardless of bumper damage.

The rearward edge of the belly pan is drilled with bolt holes into the short pan, which is original equipment, so that the entire belly pan, or blanket, is removably, but firmly attached to cover the exposed undercarriage of the vehicle.

DESCRIPTION OF A PREFERRED EMBODIMENT

Figure 1:
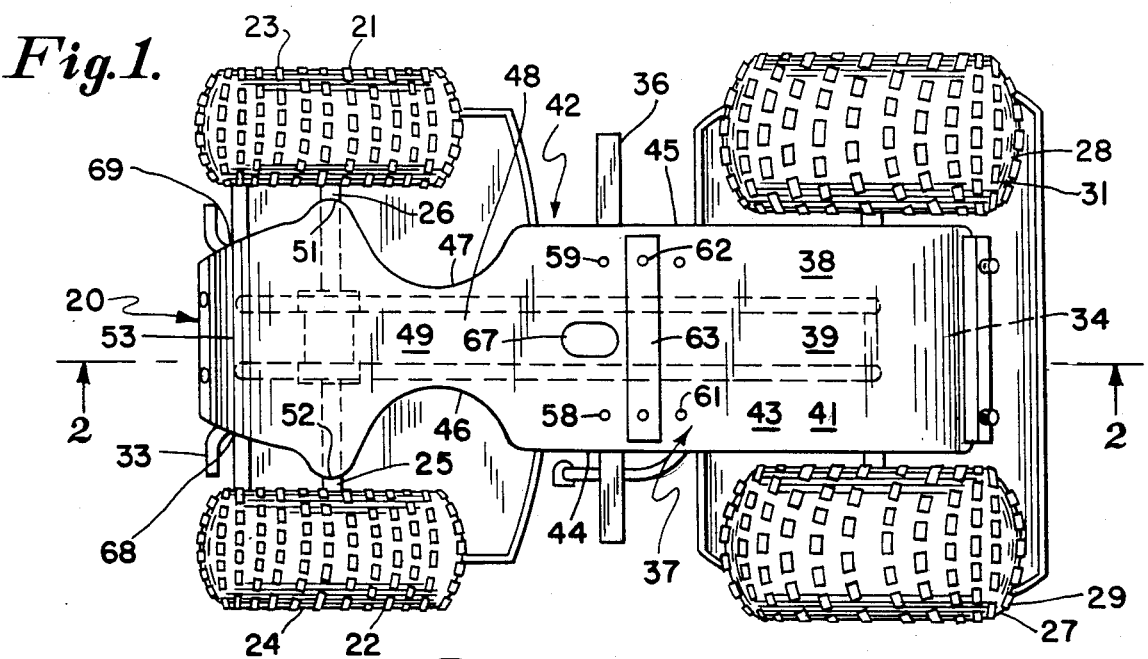
FIG. 1 is a diagrammatic, bottom, plan view of a typical four wheel all terrain vehicle with the belly pan of the invention removably attached to cover the undercarriage and form an upward curved front bumper.
Figure 2:
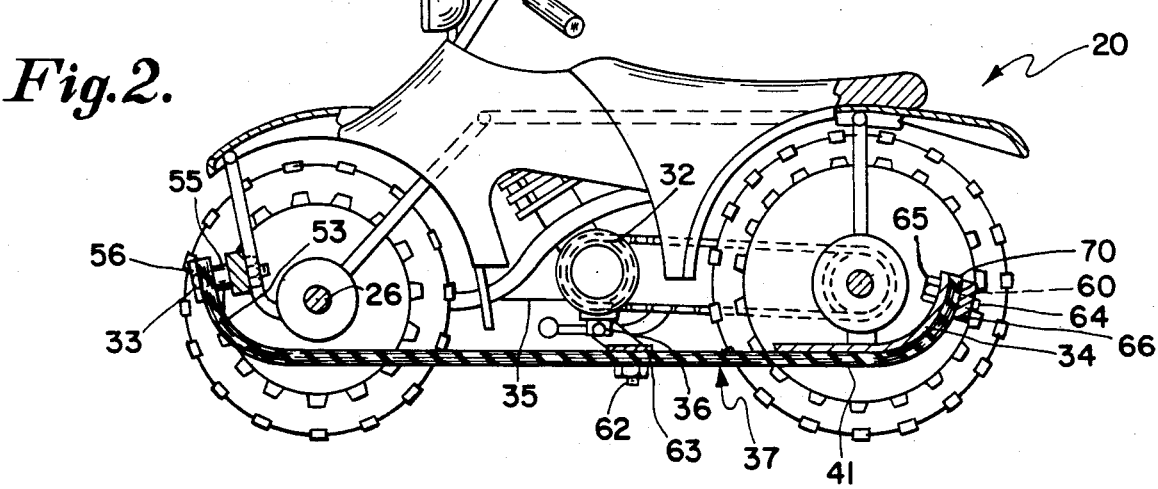
FIG. 2 is a diagrammatic side elevation, in section, on line 2—2 of FIG. 1.
Figure 3:
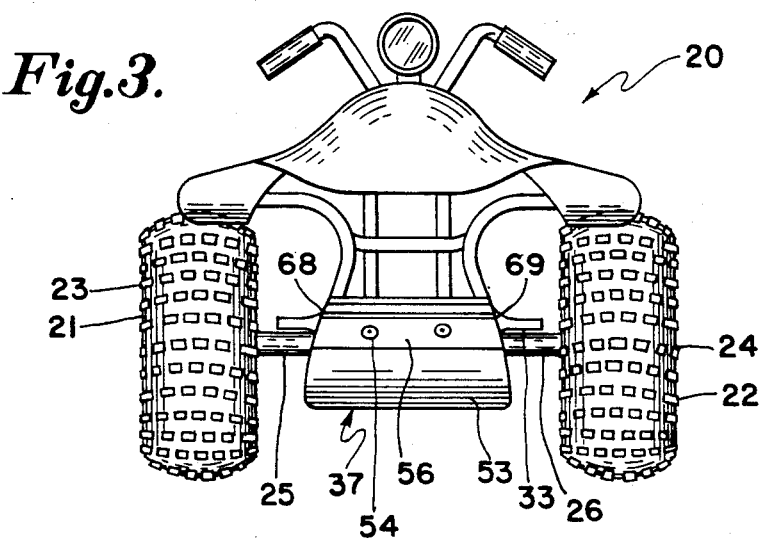
FIG. 3 is a front end elevation of the vehicle and pan shown in FIGS. 1 and 2.

A typical elongated, four wheel, all terrain vehicle 20 is shown somewhat diagrammatically in FIGS. 1-3, the vehicle 20 having a pair of laterally spaced, steerable, front wheels 21 and 22, with balloon tires 23 and 24, the front wheels having front axles 25 and 26. Vehicle 20 also has a pair of laterally spaced, drive, rear wheels 27 and 28, with balloon tires 29 and 31, of greater diameter than the diameter of the front tires 23 and 24, the wheels 27 and 28 being driven by chains and sprockets from the motor 32 which is located centrally of the vehicle.

The vehicle 20 is originally equipped with a metal front bumper 33 and a relatively short, metal pan 34, under the central rear of the elongated undercarriage 35, but most of the undercarriage 35 is exposed, including the bottom of motor 32, the laterally extending foot support bar 36, the brake housings, the power trains and housings, and other parts vulnerable to impact from logs, stumps, rocks and other solid objects run over, or into, by the vehicle.

The elongated, protective, removable, belly pan 37 of the invention is formed of flexible, rubber-like material 38, with multiple reinforcing layers of fabric 39 at least about three-eighths of an inch thick and capable of resisting impact, shock, and cuts to a high degree. Belly pan 37 comprises an elongated body 41, of the material 38 and 39, of uniform thickness, and adapted to underlie the undercarriage 35 from the front bumper 33 to the rear metal pan 34, and from the right set of wheels 21 and 28 to the left set of wheels 22 and 27, so as to substantially fill the space 42 between the left and right wheels. Belly pan 37 is thus substantially coextensive in width with the space 42 between the laterally spaced wheels and substantially co-extensive in length with the length of the exposed undercarriage 35 from front bumper 33 to the rear metal pan 34.

The belly pan 37 thus comprises a rearward, horizontal, portion 43 of rectangular configuration extending from the rear metal pan 34 forwardly to beyond the foot support bar 36 and of predetermined, substantially uniform, width, with parallel side edges 44 and 45, to cover the major part of the exposed undercarriage 35, just forwardly of the bar 36. The belly pan 37 is provided with a pair of oppositely disposed, identical, arcuate, cut-outs 46 and 47, forming an integral web, or neck, 48, of reduced lateral dimension, the cut-outs providing space for left and right full turning of the front wheels 21 and 22. The cut-outs 46 and 47 and the web 48, occupy an intermediate horizontal portion 49 of the body 41, as do a pair of oppositely disposed, identical, integral flaps 51 and 52 which project laterally to cover and protect the axles and pivot mechanism 25 and 26 of the front wheels 21 and 22.

Figure 4:
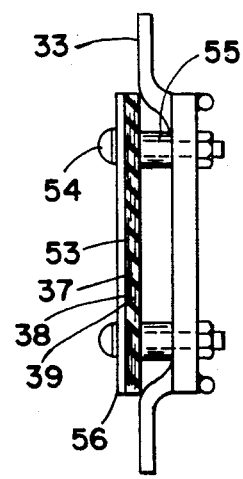
FIG. 4 is a fragmentary detail view showing how the upwardly curved, tapered front portion of the pan is removably affixed over the original equipment metal front bumper.

The forward portion 53 of the belly pan 37 is bent in a curve, upwardly around the forward part of the undercarriage and removably affixed by bolts 54 and spacers 55 under the front bumper 33, as best shown in FIG. 4. The forward portion 53 thus extends up to about the level of the front axles 25 and 26 to form a rubber-like front bumper for deflecting the vehicle from impact of stones, stumps, and other damaging obstacles in its path.

The belly pan 37 is removably affixed to fit in the space between the wheels of the four-wheel, all-terrain vehicle 20 by first affixing the forward edge portion 53 over the front bumper 33 by the bar 56, bolts 54, and spacers 55.

Two longitudinally extending rows 58 and 59 of bolt holes such as 61 are provided in the rearward portion 43, for bolts 62, and an attachment bar 63, the bolts being removably affixed to the foot support bar 36, the rows of holes permitting adjustment in case the front bumper 33 is damaged and misaligned. The rearward edge 64 of the rearward portion 43 of belly pan 37 is removably attached to the metal pan 34 by bolts 64, holes 60 drilled in the material 38 and 39, and through the pan 34 for threaded fixation by nuts 65 and attachment bar 66.

An elongated slot 67 is provided in belly pan 37 to give access to the oil drain plug of the vehicle engine, without removal of the blanket the slot 67 being intermediate of the length thereof, and located in the rearward horizontal portion 43.

The forward portion 53 of the belly pan 37 is inwardly tapered on each opposite side edge 69 and 68, to enable the front wheels to turn without contact with the pan.

I claim:

1. In combination with an elongated, all terrain vehicle having a pair of laterally spaced apart, steerable, front wheels, with axles, an elongated, exposed, undercarriage, and a pair of laterally spaced apart drive rear wheels:
    an elongated, protective, rubber-like, flexible, belly pan removably affixed to said vehicle, said pan being substantially co-extensive in width with the space between said laterally spaced wheels, having a horizontal, main body extending from said rear wheels forwardly to beyond said front wheel axles, to cover said exposed undercarriage and having an integral, upwardly curved, front portion extending up the front of said vehicle to a level proximate the level of the axles of said front wheels to form a front bumper; and
    a pair of oppositely disposed, laterally-projecting, integral flaps, each for covering and protecting one of said front wheel axles of said vehicle.

2. A combination as specified in claim 1 wherein:
    said flexible belly pan includes a pair of longitudinally extending, laterally spaced apart rows of attachment holes intermediate of the length thereof, and said vehicle includes a transversely extending foot support bar in the undercarriage thereof, said holes permitting registration of attachment bolts with said bar for undercarriages of various dimensions.

3. A removable belly pan for protecting the exposed undercarriage, chain guards, brake housings, and other vulnerable parts of a four wheel, all terrain vehicle from damaging impact with rocks, stumps, and other obstacles said belly pan comprising:
    an elongated body of flexible, reinforced, rubber-like, material substantially equal in length and width to the length and width of said exposed undercarriage and adapted to fit in the space between the front wheels and the rear wheels of said vehicle from the front to the back thereof;
    said body having a rearward portion of predetermined width, and of generally rectangular configuration, an intermediate portion of reduced width, formed by oppositely disposed cut-outs, each forming a space for the turning of one of said front wheels and a tapered forward portion adapted to be bent upwardly to form a front bumper on said undercarriage while forming a space for the turning of said front wheels; and
    said body including a pair of oppositely disposed, laterally projecting, integral flaps, at the base of said tapered portion, each for covering and protecting said undercarriage proximate one of said front wheels.

4. A device for protecting the undercarriage of an all terrain vehicle of the four wheel, motorcycle type having a front bumper, a centrally located foot support bar, a rear metal pan, and an exposed undercarriage, said device comprising:
    an elongated, belly pan or blanket, of flexible, reinforced rubber-like material, removably affixed by a front attachment cross bar and bolts over the front bumper of said vehicle, by an intermediate cross bar and bolts to the foot support bar of said vehicle, and by a rearward cross bar and bolts to the metal pan of said vehicle, said pan underlying and covering the exposed undercarriage of said vehicle;
    said elongated belly pan having an arcuate cut-out in each side edge to the rear of the front axles, and an inward taper in each side edge in front of the front axles to receive the front tires during turning.

* * * * *